United States Patent
Kang

[11] Patent Number: 6,023,390
[45] Date of Patent: Feb. 8, 2000

[54] DISTURBANCE COMPENSATION IN ACTUATOR

[75] Inventor: Chang-Ik Kang, Seoul, Rep. of Korea

[73] Assignee: SamSung Electronics Co., Ltd., Suwon, Rep. of Korea

[21] Appl. No.: 08/885,739

[22] Filed: Jun. 30, 1997

[30] Foreign Application Priority Data

Jun. 29, 1996 [KR] Rep. of Korea ...................... 96-26424

[51] Int. Cl.[7] .................................................. G11B 5/596
[52] U.S. Cl. ..................................... 360/77.04; 360/78.09
[58] Field of Search .............................. 360/77.04, 78.09

[56] References Cited

U.S. PATENT DOCUMENTS

| | | | |
|---|---|---|---|
| 3,924,268 | 12/1975 | McIntosh et al. | 360/78 |
| 4,616,276 | 10/1986 | Workman | 360/77 |
| 4,630,190 | 12/1986 | Alaimo et al. | |
| 4,792,870 | 12/1988 | Pinson . | |
| 5,010,535 | 4/1991 | Davis . | |
| 5,065,263 | 11/1991 | Yoshida et al. | |
| 5,233,586 | 8/1993 | Morisada . | |
| 5,369,345 | 11/1994 | Phan et al. | |
| 5,404,253 | 4/1995 | Painter | 360/77.04 |
| 5,585,976 | 12/1996 | Pham . | |
| 5,592,346 | 1/1997 | Sullivan . | |

OTHER PUBLICATIONS

Digital Control of Dynamic Systems, Franklin et al, 1998, p. 59 Addison–Wesley.

Primary Examiner—Aristotelis M. Psitos
Assistant Examiner—Joseph M Vann
Attorney, Agent, or Firm—Robert E. Bushnell, Esq.

[57] ABSTRACT

A control algorithm compensates for a bias force disturbance and a runout disturbance of an actuator by means of a state feedback to decrease the number of the design parameters, thereby simplifying the design process. A compensation system for the disturbances includes a state variable calculating device for receiving a discrete feedback input signal representative of an actual position of a magnetic head mounted on a front end of the actuator, so as to generate state variables; a differentiating device for differentiating the discrete feedback input signal to generate a velocity signal; and a state feedback control device for receiving the state variables, the velocity signal and the discrete feedback input signal, so as to generate a discrete control input signal to be applied to the actuator.

24 Claims, 4 Drawing Sheets

DISTURBANCE COMPENSATION IN ACTUATOR

CLAIM OF PRIORITY

This application makes reference to, incorporates the same herein, and claims all benefits accruing under 35 U.S.C. § 119 from an application for DISTURBANCE COMPENSATION IN AN ACTUATOR earlier filed in the Korean Industrial Property Office on the 29$^{th}$ day of June 1996 and there duly assigned Ser. No. 1996-26424, a copy of which application is annexed hereto.

BACKGROUND OF THE INVENTION

1. Field of the Invention

The present invention relates to disturbance compensation in an actuator, and more particularly to a method and device for compensating for a disturbance caused in an actuator of a magnetic disk drive.

2. Description of the Related Art

In general, a magnetic disk drive includes a tracking control function for a magnetic head, in order to accurately record and reproduce data. However, disturbances arise from the external environment when controlling a servo, and these disturbances become a main cause of reduced accuracy of the tracking control. These disturbances may be broadly classified into bias force disturbances, caused by the elastic character of the FPC (Flexible Printed Circuit) cable connected to the actuator, and runout disturbances, caused by repetitive or non-repetitive runout of the magnetic disk. Runout disturbance is generally caused by transversal irregularities (i.e., poor flatness) of the disk, which may arise when the center of the disk is not precisely aligned with the spindle motor axle, or when the disk is defectively mounted.

A known control algorithm has been proposed to effectively compensate for bias disturbances and runout disturbances, thereby providing precise control of the magnetic head and accurate recording and reproduction of data. According to this approach, the actuator generates an actual position value x of the magnetic head on the track. An estimating device receives the actual position value x and the control signal input u, to generate the estimated values $\hat{x}$ and $\hat{f}_B$ in accordance with the following equation:

$$\begin{vmatrix} \dot{\hat{x}} \\ \dot{\hat{v}} \\ \dot{\hat{f}}_B \end{vmatrix} = \begin{vmatrix} 0 & 0 & 0 \\ 0 & 0 & -\frac{1}{J} \\ 0 & 0 & 0 \end{vmatrix} \begin{vmatrix} \hat{x} \\ \hat{v} \\ \hat{f}_B \end{vmatrix} + \begin{vmatrix} 0 \\ \frac{K_t}{J} \\ 0 \end{vmatrix} u + \begin{vmatrix} l_1 \\ l_2 \\ l_3 \end{vmatrix} (x*-\hat{x}) \quad (1)$$

where $\hat{x}$ represents an estimated position value, $\hat{v}$ represents an estimated velocity value, $\hat{f}_B$ represents an estimated $f_B$ value, $l_1, l_2, l_3$ represent gains of the estimating device 14, and "•" represents differentiation.

It is very important to compensate for these disturbances effectively in order to achieve accurate control of the magnetic head and therefore accurate data recording and reproduction. Therefore, it is necessary to identify the effects the disturbances cause when the magnetic head follows a track for reading or writing data.

The bias force disturbance $f_B$ may be modeled by a DC signal, in view of its frequency. It can therefore be appreciated that effective compensation can be provided for the bias force disturbance $f_B$ if the controller further includes an integral controller or if the estimating device calculates the estimated values based on Equation (1). On the other hand, the runout disturbance $f_R$, must be modeled by a sinusoidal wave signal having a frequency corresponding to the angular frequency of the rotating disk. Therefore, it may not be possible to effectively compensate for the runout disturbance $f_R$, even if the controller further includes an integral controller or if the estimating device calculates the estimated values based on Equation (1). This is because the runout disturbance $f_R$ does not enter into Equation (1).

A countermeasure for this problem is to expand the bandwidth of the entire control system by increasing the gain of the controller. This approach does not offer a real solution, though, because track pitch for state-of-the-art designs is on a decreasing trend for high data density devices. It is expected that in the future track density will increase to about six times the current track density. This implies that the track pitch will decrease to ⅙ of the current track pitch. Consequently, a control algorithm is required that will effectively decrease the influence of disturbances by six-fold.

For such a control algorithm, the bandwidth should be expanded by a factor of √6 compared with existing bandwidths. However, the bandwidths of actuators currently in use are limited by input terminal saturation, so that there is a limitation on expanding the bandwidth of the system by increasing the gain of the controller. More significantly, if the bandwidth is expanded, the system may become unstable.

A demand therefore exists for a control algorithm which will compensate for the runout disturbance effectively, without expanding the bandwidth of the control system. Another known tracking control system does exist that will compensate both for the bias force disturbance and for the runout disturbance. This system employs a device for estimating both runout disturbance and bias force disturbance. It should be noted that the actual position value x (i.e., the relative position value of the magnetic head with respect to the center line of the track) can be directly measured by means of the tracking control of the magnetic head. Thus, the dynamic characteristics of the control system with respect to the actual position value x may be expressed as follows:

$$J\ddot{x} = K_t \mu - f_R - f_B \quad (2)$$

Here, the bias force disturbance $f_B$ may be modeled as a DC signal, again due to its frequency, and the runout disturbance $f_R$ may be modeled as a sinusoidal wave signal having a frequency related to the angular frequency of the disk. Thus, $\dot{f}_B = 0$, and $\ddot{f}_R = -\omega_0^2 f_R$, where $\omega_0$ is the angular frequency (expressed in, for example, radians per second) of the disk.

It follows that, by considering the actual position value x of the magnetic head and the disturbances $f_B$ and $f_R$ as the state variables, the system of Equation (1) becomes $$\begin{vmatrix} \dot{x} \\ \dot{v} \\ \dot{f}_B \\ \dot{f}_R \\ \ddot{f}_R \end{vmatrix} = \begin{vmatrix} 0 & 1 & 0 & 0 & 0 \\ 0 & 0 & -\frac{1}{J} & -\frac{1}{J} & 0 \\ 0 & 0 & 0 & 0 & 0 \\ 0 & 0 & 0 & 0 & 1 \\ 0 & 0 & 0 & -\omega_0^2 & 0 \end{vmatrix} \begin{vmatrix} x \\ v \\ f_B \\ f_R \\ \dot{f}_R \end{vmatrix} + \begin{vmatrix} 0 \\ \frac{K_t}{J} \\ 0 \\ 0 \\ 0 \end{vmatrix} u \quad (3)$$

It is noted that Equation (3) is a fifth-order linear system and therefore allows the estimating device used to generate bias and disturbance force values to be readily incorporated:

$$\begin{vmatrix} \dot{\hat{x}} \\ \dot{\hat{v}} \\ \dot{\hat{f}}_B \\ \dot{\hat{f}}_R \\ \ddot{\hat{f}}_R \end{vmatrix} = \begin{vmatrix} 0 & 1 & 0 & 0 & 0 \\ 0 & 0 & -\frac{1}{J} & -\frac{1}{J} & 0 \\ 0 & 0 & 0 & 0 & 0 \\ 0 & 0 & 0 & 0 & 1 \\ 0 & 0 & 0 & -\omega_0^2 & 0 \end{vmatrix} \begin{vmatrix} \hat{x} \\ \hat{v} \\ \hat{f}_B \\ \hat{f}_R \\ \dot{\hat{f}}_R \end{vmatrix} + \begin{vmatrix} 0 \\ \frac{K_t}{J} \\ 0 \\ 0 \\ 0 \end{vmatrix} u + \begin{vmatrix} l_1 \\ l_2 \\ l_3 \\ l_4 \\ l_5 \end{vmatrix} (x\ast-\hat{x}) \quad (4)$$

Here, "••" denotes second-order differentiation.

A further method of compensating for the runout disturbance is disclosed in U.S. Pat. No. 5,404,253, issued on Apr. 4, 1995. In the system of this reference, the bias force disturbance $f_B$ and the runout disturbance $f_R$ are modeled, respectively, by a DC signal and a sinusoidal wave signal having a frequency equal to the angular frequency $\omega_0$ of the disk. This discrete value control system is also a fifth-order system in which the estimating device estimates the head position x, the head velocity v, the bias force disturbance $f_B$, and the runout disturbance $f_R$. Equation (5) expresses a model of this system:

$$\begin{vmatrix} \hat{x}(n+1) \\ \hat{v}(n+1) \\ \hat{f}_B(n+1) \\ \hat{f}_R(n+1) \\ \dot{\hat{f}}_R(n+1) \end{vmatrix} = \begin{vmatrix} 1 & a & b_1 & b_1 & 0 \\ 0 & 1 & b_2 & b_2 & 0 \\ 0 & 0 & 1 & 0 & 0 \\ 0 & 0 & 0 & \cos\omega_0 T & -\sin\omega_0 T \\ 0 & 0 & 0 & \sin\omega_0 T & \cos\omega_0 T \end{vmatrix} \begin{vmatrix} \hat{x}(n) \\ \hat{v}(n) \\ \hat{f}_B(n) \\ \hat{f}_R(n) \\ \dot{\hat{f}}_R(n) \end{vmatrix} u(n) + \begin{vmatrix} b_1 \\ b_2 \\ 0 \\ 0 \\ 0 \end{vmatrix} [x\ast-\hat{x}(n)] \quad (5)$$

where a, $b_1$, and $b_2$ are system parameters determined when the actuator 48 is discretized, $\omega_0$ is the angular frequency of the disk, T is the sampling time, and $1_1$, $1_2$, $1_3$, $1_4$, and $1_5$ are gains of the estimating device. It is noted that inclusion of the estimating device here also leads to a fifth-order linear system.

The control input signal u(n), determined according to the estimated values $\hat{x}(n)$, $\hat{v}(n)$, $\hat{f}_B(n)$, $\hat{f}_R(n)$ generated by the estimating device of this system, has the following congruency (i.e., defining) equation:

$$u(n) \approx K_1\{x\ast-\hat{x}(n)\} - K_2\hat{v}(n) - \hat{f}_B(n)\hat{f}_R(n) \quad (6)$$

Here, the design parameters include the state feedback gains $K_1$ and $K_2$ and the gains $1_1$, $1_2$, $1_3$, $1_4$ and $1_5$ of the estimating device, which may be independently determined by means of a pole-placement design method.

The discrete value control system of Equation (5) has certain advantages, but its seven design parameters are a definite disadvantage: this large number makes the design process complicated. Moreover, because the overall system behaves as a seventh-order system, overshoot may increase during transient response. Computational speed may be undesirably slow, also, because the estimating device must generate values for five variables.

SUMMARY OF THE INVENTION

It is therefore an object of the present invention to provide a method and device for compensating for disturbances caused in an actuator by means of state feedback.

It is another object of the present invention to provide a method and device for compensating for disturbances in an actuator, in which overshoot is decreased for transient response.

It is still another object of the present invention to provide a method for reducing computing time required for disturbance compensation.

It is a still further object of the present invention to provide a method of compensating for disturbances by means of state feedback and without using an estimating device.

According to a first aspect of the present invention, a method is provided for compensating for a disturbance caused in an actuator of a magnetic disk drive, the method including a step of receiving a feedback input signal representative of an actual position at a first time step of a magnetic head mounted upon the actuator, with the first time step having a corresponding sampling time T. The method includes a further step of generating a plurality of state variable signals in dependence upon one or more of a plurality of sinusoidal wave signals evaluated at a time argument equal to T, with each one of the plurality of state variable signals representing a value at a second time step of a corresponding one of a plurality of state variables and with each one of the sinusoidal wave signals having a frequency equal to a predetermined angular frequency of a disk associated with the magnetic head. The method also includes the steps of applying the feedback signal to a differentiation device and generating from it a velocity signal representative of a velocity of the magnetic head at the first time step, and applying each one of the plurality of state variable signals, the feedback input signal, and the velocity signal to a state feedback controller and generating from them a control input signal.

According to a second aspect of the present invention, a device is provided for compensating for a disturbance caused in an actuator of a magnetic disk drive, the device including a state variable calculating device for receiving a feedback input signal representative of an actual position at a first time step of a magnetic head mounted upon the actuator and generating a first plurality of state variable signals. The state variable calculating device generates the first plurality of state variable signals in dependence upon a second plurality of state variable signals, upon the feedback input signal, and upon one or more of a plurality of sinusoidal wave signals evaluated at a time argument equal to a sampling time T corresponding to the first time step. Each one of the first plurality of state variable signals represents a value at a second time step of a corresponding one of a plurality of state variables, and each one of the second plurality of state variable signals represents a value at the first time step of a corresponding one of the plurality of state variables. Each one of the plurality of sinusoidal wave signals has a frequency equal to a predetermined angular frequency of a disk associated with the magnetic head. The device also includes a differentiation device for receiving the feedback input signal and generating from it a velocity signal representative of a velocity of the magnetic head at the first time step. The device further includes a state feedback controller for receiving the feedback signal, the velocity signal, and the first plurality of state variable signals and generating from them a control input signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

DETAILED DESCRIPTION OF THE PREFERRED EMBODIMENT

Figure 1:
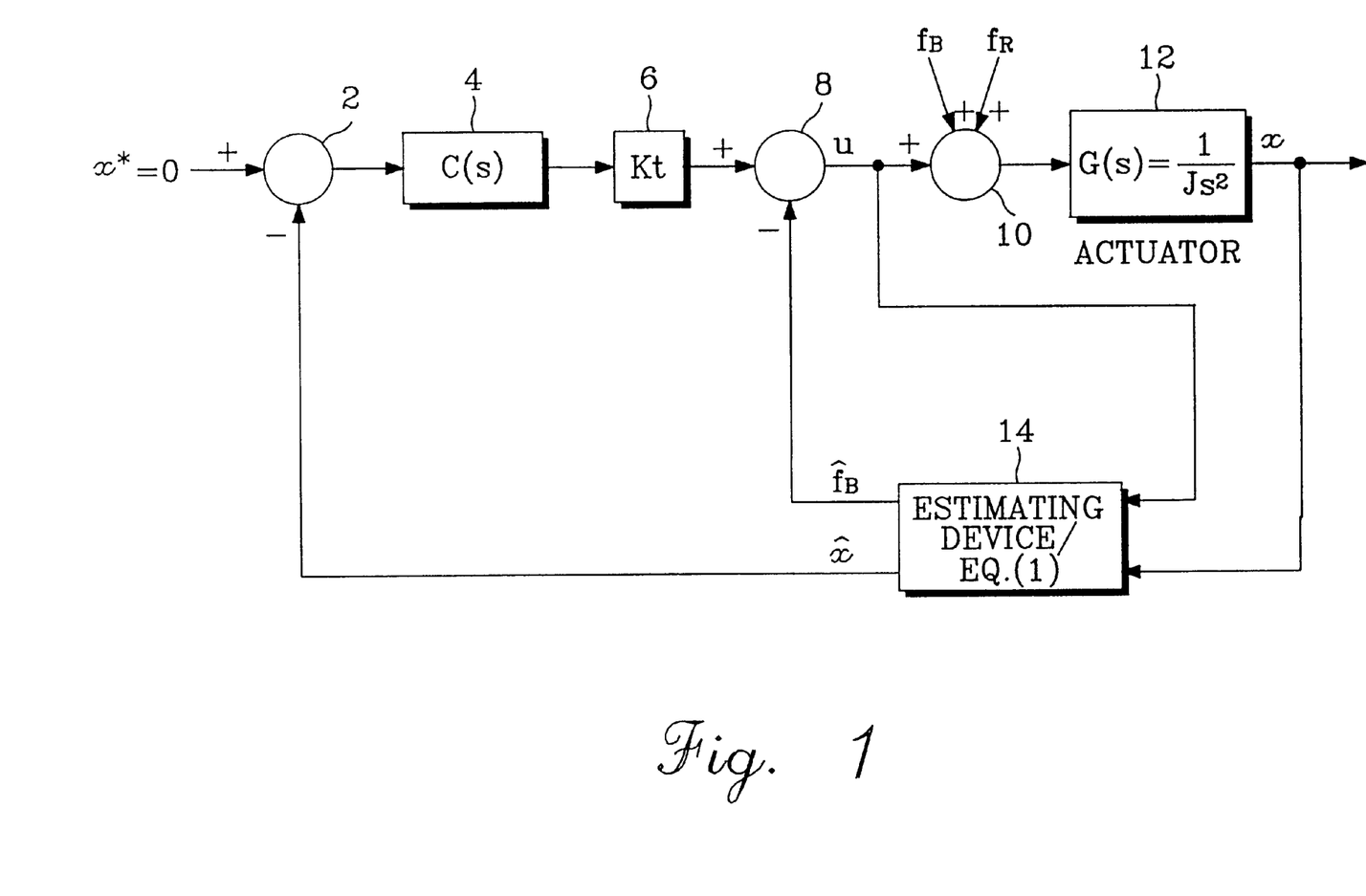
FIG. 1 is a block diagram of an existing tracking control system.

FIG. 1 illustrates a tracking control system employing an existing control algorithm, in which:

x* represents a tracking command value for controlling the track position of the magnetic head;

x represents the relative position of the head with respect to a center line of the track;

$\hat{x}$ represents an estimated value of the relative position value "x";

C(s) represents the transfer function of controller 4;

Kt represents a force constant for actuator 12;

u represents a control input signal applied to actuator 12;

$f_B$ represents a bias force disturbance;

$f_R$ represents a runout disturbance;

$\hat{f}_B$ represents an estimated value for $f_B$;

$$G(s) \cong \frac{1}{Js^2}$$

represents a transfer function for actuator 12; and

J represents the inertia of actuator 12.

The tracking command value x* for controlling the track position of the magnetic head is applied to the tracking control system of FIG. 1 from a disk controller device, e.g., a micro-controller for the disk drive. The tracking command value is an off-track command value for giving an offset when tracking. The maximum value of the tracking command value is generally about 25 percent of a track width. As FIG. 1 illustrates, the tracking command value x* is applied to an adder 2, which subtracts the estimated value $\hat{x}$ generated by an estimating device 14 from the tracking command value x*. The output of adder 2 is lagged (or delayed) at a controller 4 according to the transfer function C(s). An amplifier 6 then amplifies the output of the controller 4 by a force constant Kt. An adder 8 adds the output of amplifier 6 to the estimated value $\hat{f}_B$ from estimating device 14, thereby generating a control input signal u.

An actuator 12 controls a magnetic head servo (not shown) according to the control input signal u. It should be noted that actuator 12 is influenced by the bias force disturbance $f_B$ and the runout disturbance $f_R$. In FIG. 1, these influences are expressed by means of an adder 10. The estimated values $\hat{x}$ and $\hat{f}_B$ from estimating device 14 are applied to adders 2 and 8, respectively.

In FIG. 1 it is assumed that the tracking command value x* for controlling the track position of the magnetic head is zero, i.e., x*=0.

Figure 2:
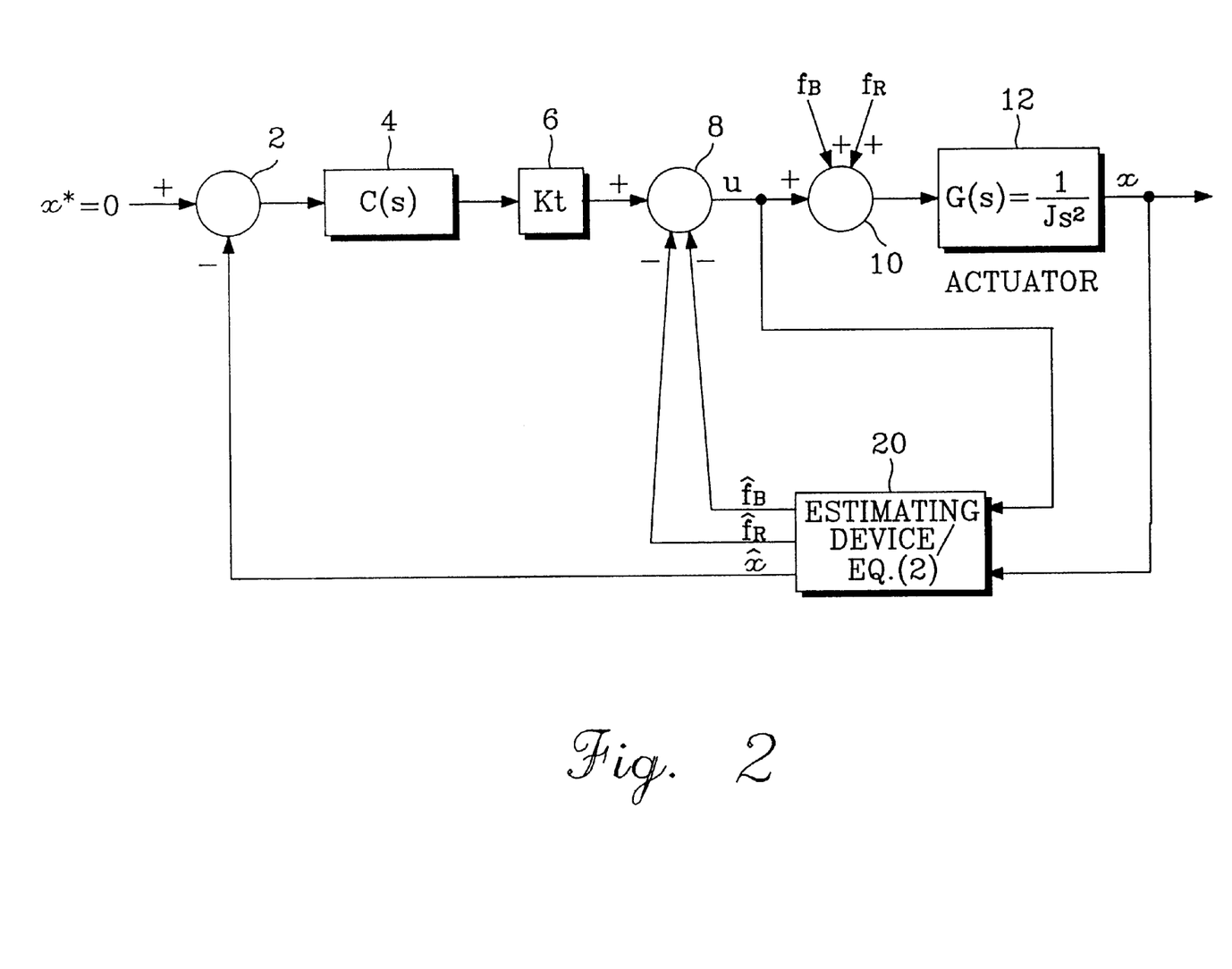
FIG. 2 is a block diagram of an existing tracking control system capable of compensating both for a bias force disturbance and for a runout disturbance.

FIG. 2 shows a second existing tracking control system that compensates for both bias force disturbance and runout disturbance. An estimating device 20 generates both the estimated value $\hat{f}_B$ of the bias force disturbance $f_B$ and the estimated value $\hat{f}_R$ of the runout disturbance $f_R$. Thus, estimating device 20 allows the system of FIG. 2 to compensate for both the bias force disturbance $f_B$ and the runout disturbance $f_R$.

Figure 3:
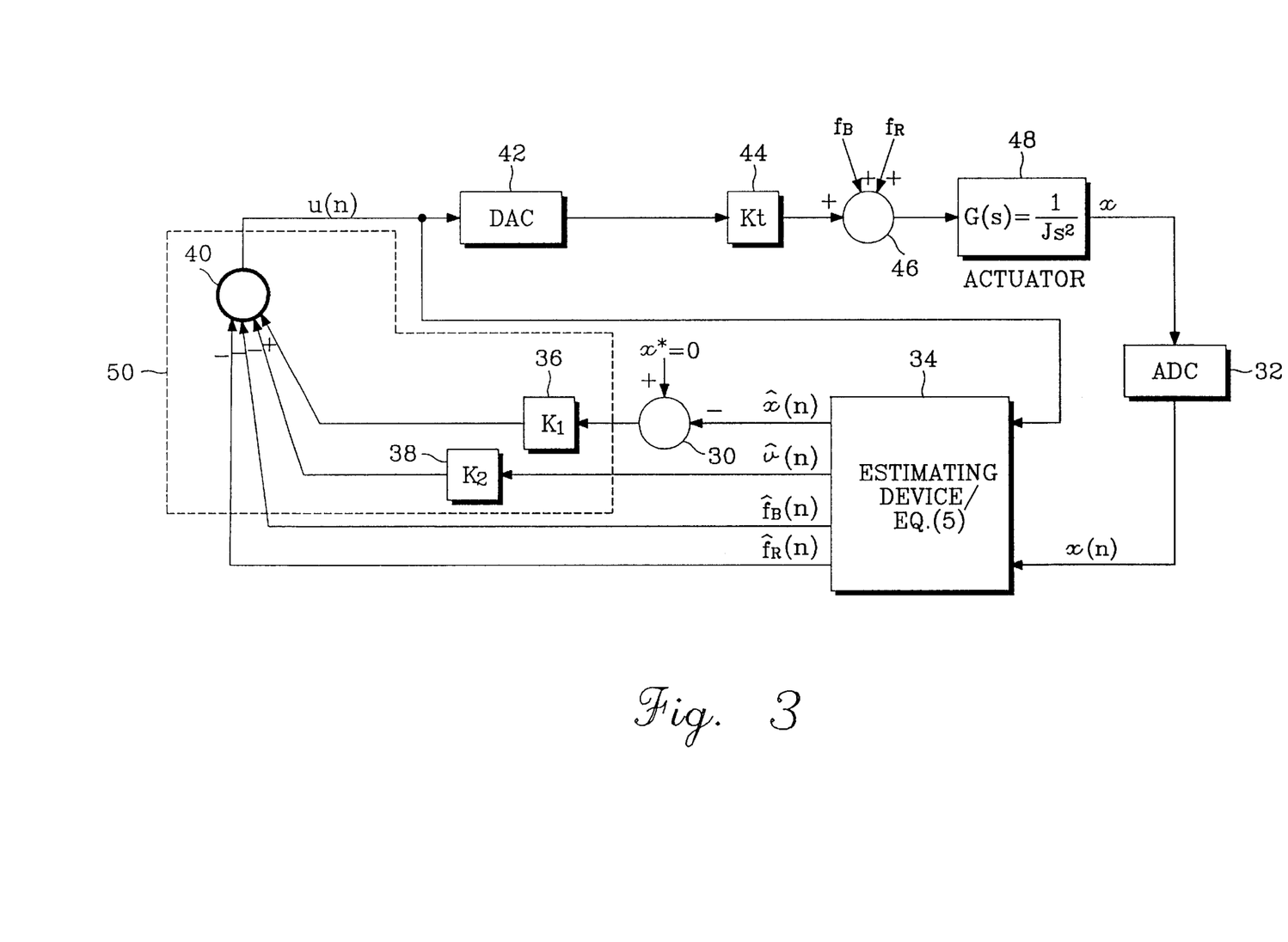
FIG. 3 is a block diagram of a discrete value control system similar to the control system of FIG. 2.

FIG. 3 shows a block diagram of a discrete value control system corresponding to the system of FIG. 2. In FIG. 3, $\hat{x}(n)$ represents an estimated position value and $\hat{v}(n)$ represents an estimated velocity value of the magnetic head. An adder 30 adds the tracking command value x*, which controls the track position of the magnetic head, to the estimated position value $\hat{x}(n)$ of the magnetic head. The discrete value control system further includes an analog-to-digital converter (ADC) 32, an estimating device 34, a state feedback controller 50, a digital-to-analog converter (DAC) 42, an amplifier 44, an adder 46 for adding the disturbances $f_B$ and $f_R$ to the output of the amplifier 44, and an actuator 48. The state feedback controller 50 includes state feedback gain devices 36 and 38 and an adder 40.

A preferred embodiment of the present invention will be described in detail hereinbelow with reference to the drawing figures. It should be noted that the present invention provides a control apparatus and method capable of compensating for bias force and runout disturbances by means of state feedback and without using an estimating device.

Referring again to FIG. 3, actuator 48 may be discretized by a zero-order Holder method as follows:

$$\begin{bmatrix} x(n+1) \\ v(n+1) \end{bmatrix} = \begin{bmatrix} 1 & a \\ 0 & 1 \end{bmatrix} \begin{bmatrix} x(n) \\ v(n) \end{bmatrix} + \begin{bmatrix} b_1 \\ b_2 \end{bmatrix} [u(n) + f_B(n) + f_R(n)] \quad (7)$$

The above-referenced 'zero-order holder method' is one of the methods transforming a continuous system into a discrete system. The above-referenced 'zero-order holder method' corresponds to the 'zero-order hold' described on page 59 of *Digital Control of Dynamic Systems*, 3rd Edition, by Gene F. Franklin, J. David Powell, and Michael L. Workman, ISBN 0-201-82054-4.

Similarly, the output of state feedback controller 50 may be expressed as $$u(n) \cong -K_1 x(n) - K_2 v(n) \quad (8)$$

It readily follows that the dynamic characteristics of the position value x(n) of the magnetic head are determined according to the following expression:

$$x(z) = \frac{b_1 z - b_1 + ab_2}{z^2 - (2 - b_1 K_1 - b_2 K_2)z - b_1 K_1 - b_2 K_2 + ab_2 K_1 + 1} [f_B(z) + f_R(z)]$$

Moreover, it is apparent from Equation (9) that $$\frac{b_1 z - b_1 + ab_2}{z^2 - (2 - b_1 K_1 - b_2 K_2)z - b_1 K_1 - b_2 K_2 + ab_2 K_1 + 1} \cong H(z)$$

where H(z) denotes the transfer function for the feedback path.

It can be clearly appreciated from Equation (9) that the positions of the poles can be freely changed by means of the state feedback: $K_1$ and $K_2$ appear in the denominator of H(z). The positions of the zeros, however, can not be changed by varying $K_1$ and $K_2$. Further, since the bias force disturbance $f_B$ resembles a DC signal and the runout disturbance $f_R$ resembles a sinusoidal wave signal with a frequency related to the angular frequency $\omega_0$ of the disk, it is apparent that the zeros should be located at 1, $e^{j\omega_0 T}$, and $e^{-j\omega_0 T}$ in order to compensate for both the bias force disturbance $f_B$ and the runout disturbance $f_R$.

Because the zero of the transfer function H(z) in Equation (8) is located at $$1 - \frac{ab_2}{b_1},$$

however, state feedback controller 50 cannot compensate both for the bias force disturbance $f_B$ and the runout disturbance $f_R$. Thus, the device of FIG. 3 must include estimating device 34 in order to successfully compensate for both the bias force disturbance $f_B$ and the runout disturbance $f_R$.

In contrast, the present invention compensates for the bias force disturbance $f_B$ and the runout disturbance $f_R$ by means of state feedback, but it does so without using an estimating device. To this end, zeros should be included at 1, $e^{j\omega_0 T}$, and $e^{-j\omega_0 T}$, in addition to the existing zero of the transfer function H(z). In order to insert these additional zeros, the system of Equation (7) must be expanded to a fifth-order equation:

$$\begin{vmatrix} x_1(n+1) \\ x_2(n+1) \\ x_3(n+1) \\ x(n+1) \\ v(n+1) \end{vmatrix} = \begin{vmatrix} \cos\omega_0 T & -\sin\omega_0 T & 0 & 1 & 0 \\ \sin\omega_0 T & \cos\omega_0 T & 0 & 1 & 0 \\ 0 & 0 & 1 & 1 & 0 \\ 0 & 0 & 0 & 1 & a \\ 0 & 0 & 0 & 0 & 1 \end{vmatrix} \begin{vmatrix} x_1(n) \\ x_2(n) \\ x_3(n) \\ x(n) \\ v(n) \end{vmatrix} + \begin{vmatrix} 0 \\ 0 \\ 0 \\ b_1 \\ b_2 \end{vmatrix} [u(n) + f_B(n) + f_R(n)] \quad (10)$$

where $x_1$, $x_2$, and $X_3$ are the state variables.

Figure 4:
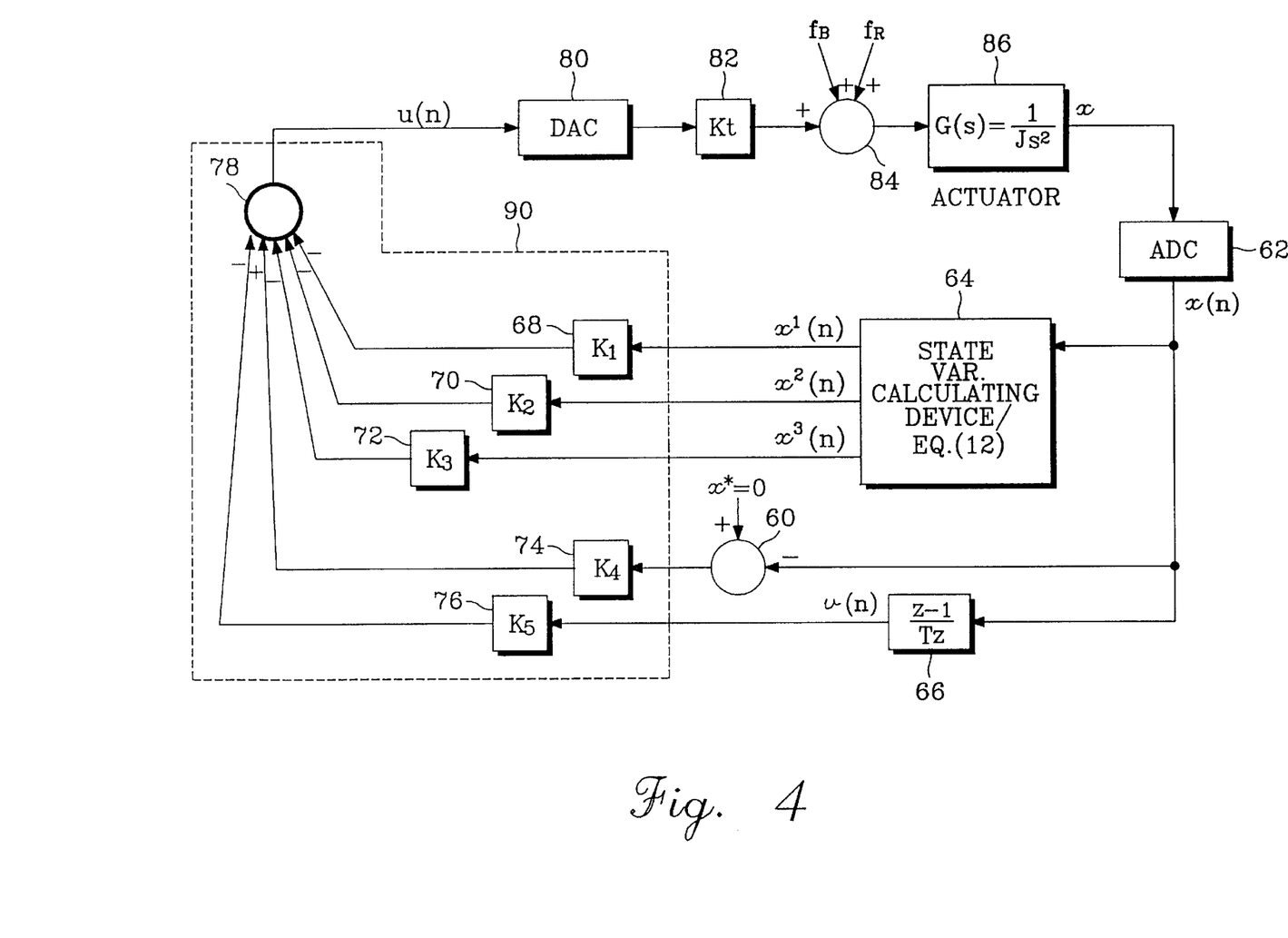
FIG. 4 is a block diagram of a discrete value control system capable of compensating for both bias force disturbance and runout disturbance according to an embodiment of the present invention.

A control apparatus according to the present invention may therefore be constructed as shown in FIG. 4 to have poles and zeros that are freely controllable. In this case, a state feedback controller 90 provides an output u(n) having the following congruence equation:

$$u(n) \approx -K_1 x_1(n) - K_2 x_2(n) - K_3 x_3(n) + K_4\{x^* - x(n)\} - K_5 v(n) \quad (11)$$

FIG. 4 shows a control system according to the present invention that includes an adder 60 for adding the tracking command value x*, for controlling the track position of the magnetic head, to the relative position value x(n) of the magnetic head with respect to the center line of the track. An analog-to-digital converter 62, a state variable calculating device 64, a differentiation device 66, a state feedback controller 90 comprised of state feedback gain devices 68, 70, 72, 74, and 76 and an adder 78, a digital-to-analog converter 80, and an amplifier 82 are also included. An adder 84 adds the bias force disturbance $f_B$ and the runout disturbance $f_R$ to the output of the amplifier 82, and an actuator 86 responds to the output of amplifier 82. It should noted that state variable calculating device 64, differentiation device 66, and state feedback controller 90 comprise a feedback system according to an embodiment of the present invention.

State variable calculating device 64 receives a discrete feedback input signal x(n) representative of the actual position of the magnetic head mounted on a front end of the actuator and generates the state variables $x_1(n)$, $x_2(n)$ and $x_3(n)$ by means of a state variable calculating equation. Differentiation device 66 differentiates the discrete feedback input signal x(n) to generate a velocity signal v(n). State feedback controller 90 receives the velocity signal v(n) from differentiation device 66, the state variables $x_1(n)$, $x_2(n)$ and $x_3(n)$ from state variable calculating device 64, and the discrete feedback input signal x(n). State feedback controller 90 generates from these inputs a discrete control input signal u(n), which it applies to actuator 86 through DAC 80, amplifier 82, and adder 84.

State feedback controller 90 acts upon the outputs of state variable calculating device 64 in accordance with Equation (11) and state variable calculating device 64 acts upon the discrete feedback input signal x(n) and the state variables $x_1(n)$, $x_2(n)$, and $x_3(n)$ in accordance with the following equation:

$$\begin{vmatrix} x_1(n+1) \\ x_2(n+1) \\ x_3(n+1) \end{vmatrix} = \begin{vmatrix} \cos\omega_0 T & -\sin\omega_0 T & 0 \\ \sin\omega_0 T & \cos\omega_0 T & 0 \\ 0 & 0 & 1 \end{vmatrix} \begin{vmatrix} x_1(n) \\ x_2(n) \\ x_3(n) \end{vmatrix} + \begin{vmatrix} 1 \\ 1 \\ 1 \end{vmatrix} x(n) \quad (12)$$

From Equations (10) and (11), the dynamic characteristic of the discrete feedback input signal x(n) may be expressed as Equation (13). The zeros according to the present invention may be readily checked by Equation (13).

$$x(z) = \frac{(b_1 z - b_1 + ab_2)(z-1)(z^2 - 2\cos\omega_0 T z + 1)}{z^5 + a_1 z^4 + a_2 z^3 + a_3 z^2 + a_4 z + a_5} \times [f_n(z) + f_R(z)] \quad (13)$$

Here, $$\frac{(b_1 z - b_1 + ab_2)(z-1)(z^2 - 2\cos\omega_0 T z + 1)}{z^5 + a_1 z^4 + a_2 z^3 + a_3 z^2 + a_4 z + a_5}$$

represents a transfer function H(z) for the feedback path. Further, the constants $a_1$, $a_2$, $a_3$, $a_4$ and $a_5$ are values determined by the state feedback gains $K_1$, $K_2$, $K_3$, K4 and $K_5$.

It is noted from Equation (13) that the transfer function H(z) includes zeros at 1, $e^{j\omega_0 T}$, and $e^{-j\omega_0 T}$, in addition to the original zero $$1 - \frac{ab_2}{b_1}.$$

Therefore, the present invention may compensate both for the bias force disturbance $f_B$ and for the runout disturbance $f_R$ by means of the state feedback. Further, it is to be noted that the dynamic characteristic according to the present invention has the fifth-order feature.

If the dynamic characteristics of the discrete feedback input signal x(n) are computed with Equation (5) in order to compare them to the present invention, the result may be expressed as follows:

$$x(z) = \frac{(b_1z - b_1 + ab_2)(z-1)(z^2 - 2\cos\omega_0 Tz + 1)}{z^5 + a'_1z^4 + z'_2z^3 + a'_3z^2 + a'_4z + a'_5} \times H'(z) \times [f_B(z) + f_R(z)] \quad (14)$$

Here, H'(z) is a function representing a filter, which is as follows:

$$H'(z) \cong \frac{z^2 + (b_1K_1 + b_2K_2 - 2 + l_1) + (b_1K_1 - 1 + l_1)(b_2K_2 - 1) + (a - b_1K_2)(b_2K_1 + l_2)}{z^2 + (b_1K_1 + b_2K_2 - 2)z + (b_1K_1 - 1)(b_2K_2 - 1) + (a - b_1K_2)b_2K_1}$$

In Equation (14), the constants $a_1'$, $a_2'$, $a_3'$, $a_4'$ and $a_5'$ are values determined by the gains $1_1$, $1_2$, $1_3$, $1_4$, and $1_5$ of the estimating device.

As can be understood from Equation (14), the device according to the existing system also can compensate completely for the bias force disturbance $f_B$ and the runout disturbance $f_R$. However, the dynamic characteristic has the seventh-order feature. Further, it can be noted that compared with the present invention, the existing system has a configuration additionally including the filter H'(z). Therefore, the overshoot of the present invention is reduced relative to the existing system.

Further, the present invention has the five design parameters $K_1$, $K_2$, $K_3$, $K_4$, and $K_5$, while the existing system requires seven design parameters: $K_1$, $K_2$, $1_1$, $1_2$, $1_3$, $1_4$ and $1_5$. Thus, the design process of the present invention is simplified.

From a comparison of Equation (5) with Equation (12), it can be understood that the computing time for the present invention is reduced relative to the existing system. The following reference table summarized these differences between the existing system and present invention::

REFERENCE TABLE

| Feature | Existing Systems | The Present Invention |
|---|---|---|
| Compensation Capability | Good | Good |
| Transient Response Feature | 7th order; Equation (14) | 5th order; Equation (13) |
| Overshoot | Increase | Decrease |
| Number of Design Parameters | 7 | 5 |
| Computing Time | Long | Short |

In conclusion, the control algorithm according to the present invention compensates for the disturbances by means of the state feedback, not by means of an estimating device, so that the number of design parameters is reduced, thereby simplifying the design process. Further, since the dynamic characteristics of the whole system have the fifth-order feature, the overshoot and computing time are reduced.

The preferred embodiment is given by way of example, and as a means for explaining the use and making of the present invention. The embodiment is subject to routine modifications by those of ordinary skill in the art. The present invention is not limited to the illustrative embodiments, but is defined by the appended claims.

What is claimed is:

1. A method of compensating for a disturbance caused in an actuator of a magnetic disk drive, characterized in that:

a zero positioned at 1 corresponding to a bias force disturbance and zeros positioned at $e^{j\omega_0 T}$ and $e^{-j\omega_0 T}$ corresponding to a runout disturbance are supplemented to a transfer function for a feedback path of a feedback system, so as to compensate for a bias force disturbance and a runout disturbance caused in said actuator prepared in a closed loop discrete system.

2. A method of compensating for a disturbance according to claim 1, wherein said transfer function for the feedback path is represented by $$H(z) = \frac{(b_1z - b_1 + ab_2)(z-1)(z^2 - 2\cos\omega_0 Tz + 1)}{z^5 + a_1z^4 + a_2z^3 + a_3z^2 + a_4z + a_5}$$

where $a_1$, $a_2$, $a_3$, $a_4$ and $a_5$ are constants determined by state feedback gains $K_1$, $K_2$, $K_3$, $K_4$ and $K_5$; a, $b_1$ and $b_2$ are system parameters determined when said actuator is discretized; and $\omega_0$ is revolution frequency of a disk.

3. A device of compensating for a disturbance caused in an actuator of a magnetic disk drive, comprising:

a state variable calculating means for receiving a discrete feedback input signal representative of an actual position of a magnetic head mounted on a front end of said actuator, so as to generate state variables based on an equation represented by $$\begin{vmatrix} x_1(n+1) \\ x_2(n+1) \\ x_3(n+1) \end{vmatrix} = \begin{vmatrix} \cos\omega_0 T & -\sin\omega_0 T & 0 \\ \sin\omega_0 T & \cos\omega_0 T & 0 \\ 0 & 0 & 1 \end{vmatrix} \begin{vmatrix} x_1(n) \\ x_2(n) \\ x_3(n) \end{vmatrix} + \begin{vmatrix} 1 \\ 1 \\ 1 \end{vmatrix} x(n)$$

wherein $x_1(n)$, $x_2$ and $x_3$ are said state variables;

a differentiating means for differentiating said discrete feedback input signal to generate a velocity signal; and a state feedback control means for receiving said state variables, said velocity signal and said discrete feedback input signal, so as to generate a discrete control input signal to be applied to said actuator based on an equation represented by $$u(n) \cong -K_1x_1(n) - K_2x_2(n) - K_3x_3(n) - K_4\{x^* - x(n)\}K_5v(n)$$

wherein $K_1$, $K_2$, $K_3$, $K_4$ and $K_5$ are sate feedback gains.

4. A method of compensating for a disturbance caused in an actuator of a magnetic disk drive, comprising the steps of:

receiving a feedback input signal representative of an actual position at a first time step of a magnetic head mounted upon said actuator, with said first time step having a corresponding sampling time T;

generating a plurality of state variable signals in dependence upon said feedback input signal and upon one or more of a plurality of sinusoidal wave signals evaluated at a time argument equal to T, with each one of said plurality of state variable signals representing a value at a second time step of a corresponding one of a plurality of state variables and with each one of said sinusoidal wave signals having a frequency equal to a predetermined angular frequency of a disk associated with said magnetic head;

applying said feedback input signal to a differentiation device to generate therefrom a velocity signal representative of a velocity of said magnetic head at said first time step; and applying each one of said plurality of state variable signals, said feedback input signal, and said velocity signal to a state feedback controller to generate therefrom a control input signal.

5. The method of claim 4, wherein said step of generating a plurality of state variable signals includes:

generating a plurality of first signals by summing, for each one of said plurality of state variables, a plurality of second signals corresponding to said state variable to generate a first signal corresponding to said state variable, with each one of said plurality of second signals, representing a product of a selected one of said plurality of sinusoidal wave signals evaluated at a time argument equal to T and a value at said first time step of a corresponding one of said plurality of state variables; and summing said feedback input signal successively with each one of said plurality of first signals to generate said plurality of state variable signals.

6. The method of claim 5, wherein said step of applying said signals to said state feedback controller includes:

applying said feedback input signal to a first state feedback gain device, applying said velocity signal to a second state feedback gain device, and applying each one of said plurality of state variable signals to a corresponding one of a plurality of other state feedback gain devices to generate output signals thereof; and subtracting said output signal of said third state feedback device and said output signals of said plurality of first state feedback devices from said output signal of said second state feedback device to generate a control input signal.

7. The method of claim 6, wherein said step of generating said plurality of first signals and said step of summing said feedback input signal successively with each one of said plurality of first signals are performed by a state variable calculating device.

8. The method of claim 7, wherein said plurality of state variables includes at least a first, a second, and a third state variable.

9. The method of claim 8, wherein said control input signal is generated by a feedback system including in a feedback path therein said state variable calculating device, said differentiation device, and said state feedback controller, with a transfer function of said feedback path having a plurality of zeros, with $\omega_0$ representing said predetermined angular frequency, and with said plurality of zeros including zeros positioned at $z=1$, $z=e^{j\omega_0 T}$, and $z=e^{-j\omega_0 T}$.

10. The method of claim 9, wherein said plurality of state variables consists of said first, second, and third state variables and said plurality of other state feedback gain devices consists of a third state feedback gain device corresponding to said first state variable, a fourth state feedback gain device corresponding to said second state variable, and a fifth state feedback gain device corresponding to said third state variable.

11. The method of claim 10, wherein said transfer function is represented by H(z), with $$H(z) = \frac{(b_1 z - b_1 + ab_2)(z-1)(z^2 - 2\cos\omega_0 Tz + 1)}{z^5 + a_1 z^4 + a_2 z^3 + a_3 z^2 + a_4 z + a_5};$$

with $a_1$, $a_2$, $a_3$, $a_4$, and $a_5$ representing constants determined by a state feedback gain $K_1$ associated with said third state feedback gain device, a state feedback gain $K_2$ associated with said fourth state feedback gain device, a state feedback gain $K_3$ associated with said fifth state feedback gain device., a state feedback gain $K_4$ associated with said first state feedback gain device, and a state feedback gain $K_5$ associated with said second state feedback gain device; and with a, $b_1$, and $b_2$ representing system parameters determined by discretization of said actuator in accordance with a zero-order Holder method.

12. The method of claim 5, wherein said step of generating said plurality of first signals and said step of summing said feedback input signal successively with each one of said plurality of first signals are performed by a state variable calculating device.

13. The method of claim 4, wherein said plurality of state variables includes at least a first state variable, a second state variable, and a third state variable.

14. The method of claim 13, wherein said plurality of state variables consists of said first, second, and third state variables.

15. A device for compensating for a disturbance caused in an actuator of a magnetic disk drive, said device comprising:

a state variable calculating device for receiving a feedback input signal representative of an actual position at a first time step of a magnetic head mounted upon said actuator and generating a first plurality of state variable signals in dependence upon a second plurality of state variable signals, upon said feedback input signal, and upon one or more of a plurality of sinusoidal wave signals evaluated at a time argument equal to a sampling time T corresponding to said first time step, with each one of said first plurality of state variable signals representing a value at a second time step of a corresponding one of a plurality of state variables, with each one of said second plurality of state variable signals representing a value at said first time step of a corresponding one of said plurality of state variables, and with each one of said sinusoidal wave signals having a frequency equal to a predetermined angular frequency of a disk associated with said magnetic head;

a differentiation device for receiving said feedback input signal and generating therefrom a velocity signal representative of a velocity of said magnetic head at said first time step; and a state feedback controller for receiving said feedback input signal, said velocity signal, and said first plurality of state variable signals and generating therefrom a control input signal.

16. The device of claim 15, wherein said state variable calculating device includes:

means for generating a plurality of first signals by summing, for each one of said plurality of state variables, a plurality of second signals corresponding to said state variable to generate a first signal corresponding to said state variable, with each one of said plurality of second signals representing a product of a selected one of said plurality of sinusoidal wave signals evaluated at a time argument equal to T and a value at said first time step of a corresponding one of said plurality of state variables; and means for summing said feedback input signal successively with each one of said plurality of first signals to generate said first plurality of state variable signals.

17. The device of claim 16, wherein:

said plurality of state variables includes at least a first state variable, a second state variable, and a third state variable;

said first plurality of state variable signals includes at least a first later state variable signal representing at said second time step a value of said first state variable, a second later state variable signal representing at said second time step a value of said second state variable, and a third later state variable signal representing at said second time step a value of said third state variable; and said second plurality of state variable signals includes at least a first earlier state variable signal representing at said first time step a value of said first state variable, a second earlier state variable signal representing at said first time step a value of said second state variable, and a third earlier state variable signal representing at said first time step a value of said third state variable.

18. The device of claim 17, wherein a feedback path defined therein includes said variable calculating device, said differentiation device, and said state feedback controller, with a transfer function of said feedback path having a plurality of zeros, with $\omega_0$ representing said predetermined angular frequency, and with said plurality of zeros including zeros positioned at $z=1$, $z=e^{j\omega_0 T}$, and $z=e^{-j\omega_0 T}$.

19. The device of claim 18, wherein said plurality of state variables consists of said first, second, and third state variables and said state variable calculating device generates said first plurality of state variable signals in accordance with an equation represented by $$\begin{vmatrix} x_1(n+1) \\ x_2(n+1) \\ x_3(n+1) \end{vmatrix} = \begin{vmatrix} \cos\omega_0 T & -\sin\omega_0 T & 0 \\ \sin\omega_0 T & \cos\omega_0 T & 0 \\ 0 & 0 & 1 \end{vmatrix} \begin{vmatrix} x_1(n) \\ x_2(n) \\ x_3(n) \end{vmatrix} + \begin{vmatrix} 1 \\ 1 \\ 1 \end{vmatrix} \{x^* - x(n)\},$$

with $x^*$ representing a tracking command value signal applied to said device and $x(n)$ representing a relative position value signal applied to said device, whereby $x^*-x(n)$ represents said feedback input signal; with $x_1(n)$, $x_2(n)$, and $x_3(n)$ representing said first, second, and third earlier state variable signals, respectively; and with $x_1(n+1)$, $x_2(n+1)$, and $x_3(n+1)$ representing said first, second, and third later state variable signals, respectively.

20. The device of claim 19, wherein said state feedback controller includes:
a first state feedback gain device adapted to amplifying said feedback input signal by a first state feedback gain;
a second state feedback gain device adapted to amplifying said velocity signal by a second state feedback gain;
a third state feedback gain device adapted to amplifying said first later state variable signal by a third state feedback gain;
a fourth state feedback gain device adapted to amplifying said second later state variable signal by a fourth state feedback gain;
a fifth state feedback gain device adapted to amplifying said third later state variable signal by a fifth state feedback gain.

21. The device of claim 20, wherein said state feedback controller further includes an adder adapted to subtracting an output signal of each one of said plurality of other state feedback gain devices and an output signal of said second state feedback gain device from an output signal of said first state feedback gain device to generate said control input signal.

22. The device of claim 21, wherein said control input signal is represented by u(n), with $$u(n) = -K_1 x_1(n) - K_2 x(n) - K_3 x_3(n) + K_4\{x^* - x(n)\} - K_5 v(n),$$

with v(n) representing said velocity signal, and with $K_4$, $K_5$, $K_1$, $K_2$, and $K_3$ representing said first, second, third, fourth, and fifth state feedback gains, respectively.

23. The device of claim 15, wherein said state feedback controller includes:
a first state feedback gain device adapted to amplifying said feedback input signal by a first state feedback gain;
a second state feedback gain device adapted to amplifying said velocity signal by a second state feedback gain; and
a plurality of other state feedback gain devices, with each one of said plurality of other state feedback gain devices being adapted to amplifying a corresponding one of said first plurality of state variable signals by one of a plurality of other state feedback gains corresponding to said other state feedback gain device.

24. The device of claim 23, wherein said state feedback controller further includes an adder adapted to subtracting an output signal of each one of said plurality of other state feedback gain devices and an output signal of said second state feedback gain device from an output signal of said first state feedback gain device to generate said control input signal.

* * * * *